United States Patent
Moon et al.

(10) Patent No.: US 9,282,277 B2
(45) Date of Patent: Mar. 8, 2016

(54) STORAGE DEVICE AND CONTROLLER TO SELECTIVELY ACTIVATE A STORAGE MEDIA

(75) Inventors: John Edward Moon, Superior, CO (US); Robert Dale Murphy, Boulder, CO (US); Paul Francis Kusbel, Longmont, CO (US); Todd Ray Strope, Longmont, CO (US); Preston Donald Sellers, Broomfield, CO (US)

(73) Assignee: Seagate Technology LLC, Cupertino, CA (US)

(*) Notice: Subject to any disclaimer, the term of this patent is extended or adjusted under 35 U.S.C. 154(b) by 2047 days.

(21) Appl. No.: 12/339,311

(22) Filed: Dec. 19, 2008

(65) Prior Publication Data

US 2010/0158486 A1 Jun. 24, 2010

(51) Int. Cl.
| | |
|---|---|
| *H04N 5/76* | (2006.01) |
| *H04N 5/783* | (2006.01) |
| *H04N 5/765* | (2006.01) |
| *H04N 5/907* | (2006.01) |
| *H04N 21/4147* | (2011.01) |

(52) U.S. Cl.
CPC ............. *H04N 5/765* (2013.01); *H04N 5/907* (2013.01); *H04N 21/4147* (2013.01)

(58) Field of Classification Search
USPC .................... 386/291–295, 343–352
See application file for complete search history.

(56) References Cited

U.S. PATENT DOCUMENTS

| | | | |
|---|---|---|---|
| 6,311,011 B1* | 10/2001 | Kuroda ...................... 386/297 |
| 7,433,579 B2* | 10/2008 | Arishima ................... 386/341 |
| 2006/0179462 A1* | 8/2006 | Willame et al. ............ 725/90 |
| 2007/0036043 A1 | 2/2007 | Sun ...................... 369/30.04 |
| 2007/0112888 A1 | 5/2007 | Rajakarunanayake ....... 707/204 |
| 2007/0172196 A1* | 7/2007 | Kusunoki et al. ........... 386/83 |
| 2007/0256110 A1 | 11/2007 | Russ et al. ................ 725/107 |
| 2008/0118229 A1 | 5/2008 | Bliss ...................... 386/123 |
| 2008/0133781 A1* | 6/2008 | Ashley et al. .............. 710/17 |
| 2009/0222875 A1* | 9/2009 | Cheng et al. .............. 725/147 |

* cited by examiner

*Primary Examiner* — Nigar Chowdhury
(74) *Attorney, Agent, or Firm* — Cesari & Reed LLP; Kirk A. Cesari (57) ABSTRACT

In a particular embodiment, a system includes a controller adapted to determine a data transfer rate associated with at least one data stream to be written to a storage media and to selectively activate at least one of a first memory and a second memory based on the data transfer rate to record the at least one data stream.

23 Claims, 12 Drawing Sheets

STORAGE DEVICE AND CONTROLLER TO SELECTIVELY ACTIVATE A STORAGE MEDIA

FIELD OF THE INVENTION

The present invention relates generally to a storage device and a controller adapted to selectively activate a storage media, and more particularly to a storage device including a controller adapted to selectively activate one or more storage media to store and retrieve media data.

DETAILED DESCRIPTION OF ILLUSTRATIVE EMBODIMENTS

A digital video recorder (DVR) system or a personal video recorder (PVR) system includes a storage media to store a selected media stream. As used herein, the terms "DVR" and "PVR" are used interchangeably. In a particular embodiment, the DVR system can include pause and rewind functionality with regard to a live media stream, such as live television, which pause/rewind functionality makes use of a pause buffer, which may be a media cache of the storage media or which may be recorded to a second storage media. The pause buffer to store a time shift history of the active tuner (or tuners if the DVR system has multiple tuners). The pause buffer can be configured to store from about a half an hour to several hours of media content, depending on the size of the pause buffer and the number of media streams being recorded. Since this functionality is available at all times, even when a user is not actively viewing or requesting recorded information, if the pause buffer is stored to a disc recording media, the disc recording media of the DVR system is spun up and operating at all times, consuming power and generating heat, which heat can degrade performance of the storage media and lead to premature failure of the DVR system. Further, having the disc recording media spun up at all times also results in excessive acoustic noise and poor reliability due to unnecessary operation for large portions of the time.

Using a storage device that includes a first storage media to store the pause buffer and associated metadata and that includes a second storage media to perform background record and replay operations reduces wear on the second storage media and reduces power consumption and heat dissipation. In a particular embodiment, the second storage media can be a disc media and the first storage media can be a solid-state memory. Such as storage device can be referred to as a "hybrid storage device" because it includes both solid-state and disc storage media.

In another particular embodiment, both of the first and second storage media can be solid-state storage media. As used herein, the term "solid-state storage media" refers to storage media that utilize semiconductor properties to represent data values and that have no moving parts to record or retrieve the data. A flash memory is one particular example of a solid-state storage media. In a particular embodiment, the hybrid storage device is included within a DVR system. The hybrid storage device includes a controller adapted to differentiate different states of the DVR system and to selectively activate the first storage media, the second storage media, or any combination thereof to record and/or retrieve media data based on the determined state of the DVR system. In a particular example, the controller is adapted to selectively activate at least one of the first storage media and the second storage media based on a data transfer rate at an interface of the storage device.

Figure 1:
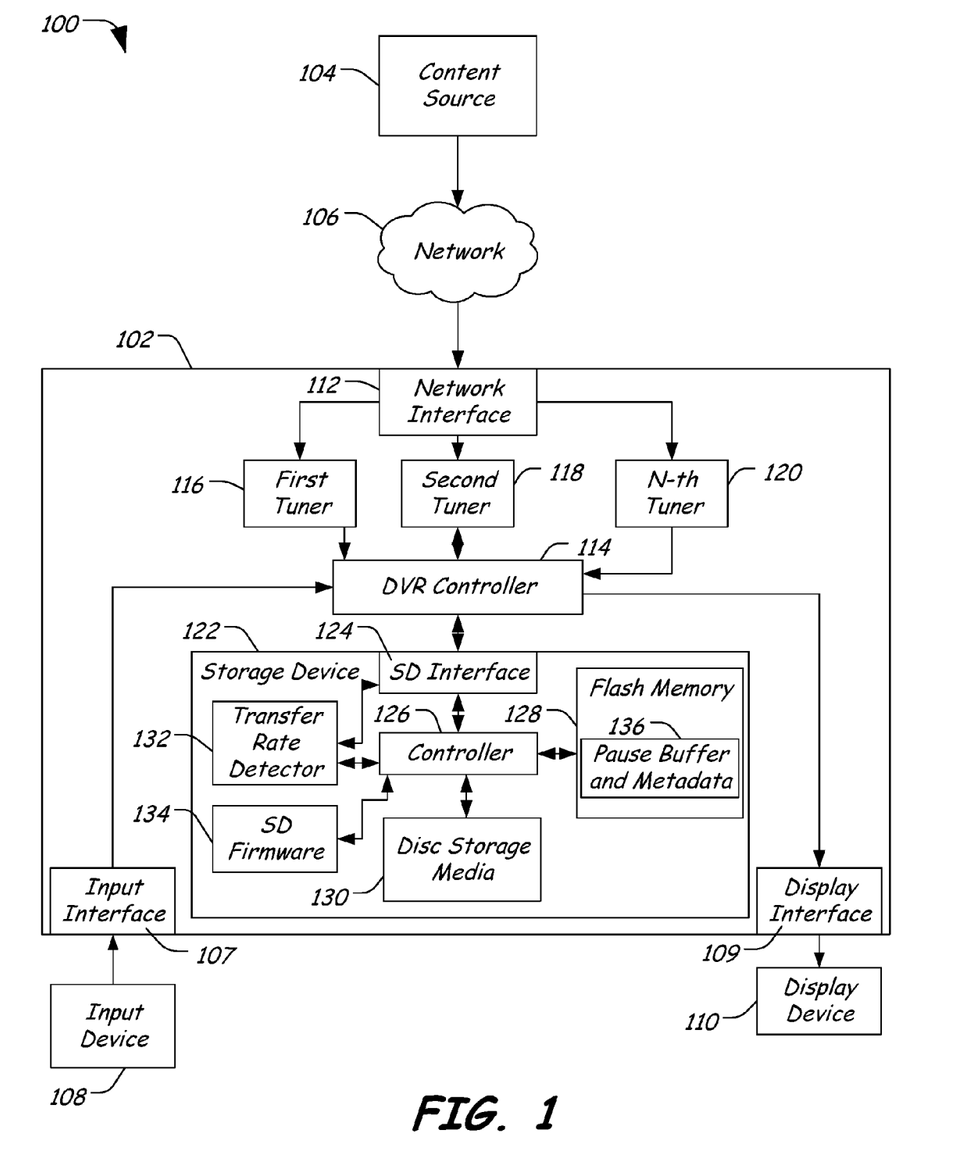
FIG. 1 is a block diagram of a particular illustrative embodiment of a system including a particular digital video recorder (DVR) having a hybrid storage device with a controller to store and retrieve media data.

FIG. 1 is a block diagram of a particular illustrative embodiment of a system 100 including a particular digital video recorder (DVR) 102 having a hybrid storage device 122 with a controller 126 to store and retrieve media data. The DVR 102 can communicate with a content source 104 via a network 106. In a particular embodiment, the DVR 102 can be a computer, a set-top box device, a video receiver (such as an Internet Protocol television receiver), another electronic device, or any combination thereof. The network 106 can be a computer network, a television (cable) network, a satellite broadcast network, another type of network (wired or wireless), or any combination thereof. In a particular embodiment, the DVR 102 is adapted to receive media content, including audio data, video data, text data, associated metadata, or any combination thereof from the network and to store the data at the storage device 122. In a particular embodiment, the media content received from the network 106 can be referred to as media data, media content, a media data stream, or any combination thereof.

The DVR 102 includes a network interface 112 that is adapted to communicate with the network 106. The DVR 102 further includes a first tuner 116, a second tuner 118, and an n-th tuner 120, which tuners 116, 118, and 120 are adapted to decode particular channels from a received media stream. It should be understood that the DVR 102 can include any number of tuners depending on the particular implementation. The number of tuners determines the number of decoded media streams that can be received at the storage device 122 concurrently.

The DVR 102 further includes a DVR controller 114 that is coupled to an input interface 107, which is responsive to an input device 108, such as a keyboard, a remote control, another input device, or any combination thereof, to receive user selections. The DVR controller 114 can also be coupled to a display interface 109, which can provide display data to a display device 110, such as a television, a computer display, another display device, or any combination thereof. The DVR controller 114 is also coupled to the storage device 122. The DVR controller 114 is adapted to provide user menus (such as electronic program guide information and other user selectable elements) to the display device 110 and to receiver user input from the input device 108.

In a particular example, the DVR controller 114 is adapted to provide an electronic program guide (EPG) menu to the display device 110 via the display interface 109, which EPG menu lists television programs, which a user can select for viewing and/or for recording. In this particular example, the DVR 102 is provided with three tuners, allowing a user to record two programs (on two different channels) simultaneously while viewing a third program (on a third channel). In a particular embodiment, the DVR controller 114 is adapted to receive user inputs to schedule recording of one or more programs (media data or media data streams and associated metadata).

The storage device 122 includes a storage device (SD) interface 124 that is coupled to the DVR controller 114 to receive media data, such as a decoded television program(s) and associated metadata. The SD interface 124 includes a controller 126 that is coupled to the SD interface 124 and that is adapted to determine a state of the DVR 102 and to selectively activate at least one of a flash memory 128 and a disc storage media 130 to store media data, to retrieve media data, or any combination thereof. The storage device 122 further includes a transfer rate detector 132 that is coupled to the SD interface 124 and to the controller 126. The transfer rate detector 132 is adapted to measure a data transfer rate associated with data received via the SD interface 124. The controller 126 is adapted to use transfer rate data from the transfer rate detector 107 to select where to store the media data and to selectively activate the disc storage media 130, the flash memory 128, or any combination thereof to record the media data based on the transfer rate data. In a particular example, the controller 126 can use the flash memory 128 to store a first media data stream at a pause buffer with associated metadata 136. If the first media data stream is currently being viewed, the flash memory 128 can store and retrieve the first media data stream for pause/rewind functionality. Further, the controller 126 can use the disc storage media 130 to store at least one second media data stream in the background based on pre-scheduled recording(s), to playback pre-recorded media content, or any combination thereof. As used herein, the terms "media data streams" and "media content" can be used interchangeably. When a second data stream is not being recorded, the disc storage media 130 can be in a reduced power state.

The storage device 122 also includes storage device firmware 134 that includes instructions executable by the controller 126 to download an electronic program guide, to provide the electronic program guide to the display device 110 via the display interface 109, and to provide menu options for user selection of programs for viewing and/or recording. In a particular embodiment, the DVR 102 is adapted to provide pause, rewind, and playback functionality for a selected program that is being viewed. A user may interact with the electronic program guide to access such functionality via the input device 108, such as a remote control.

Figure 2:
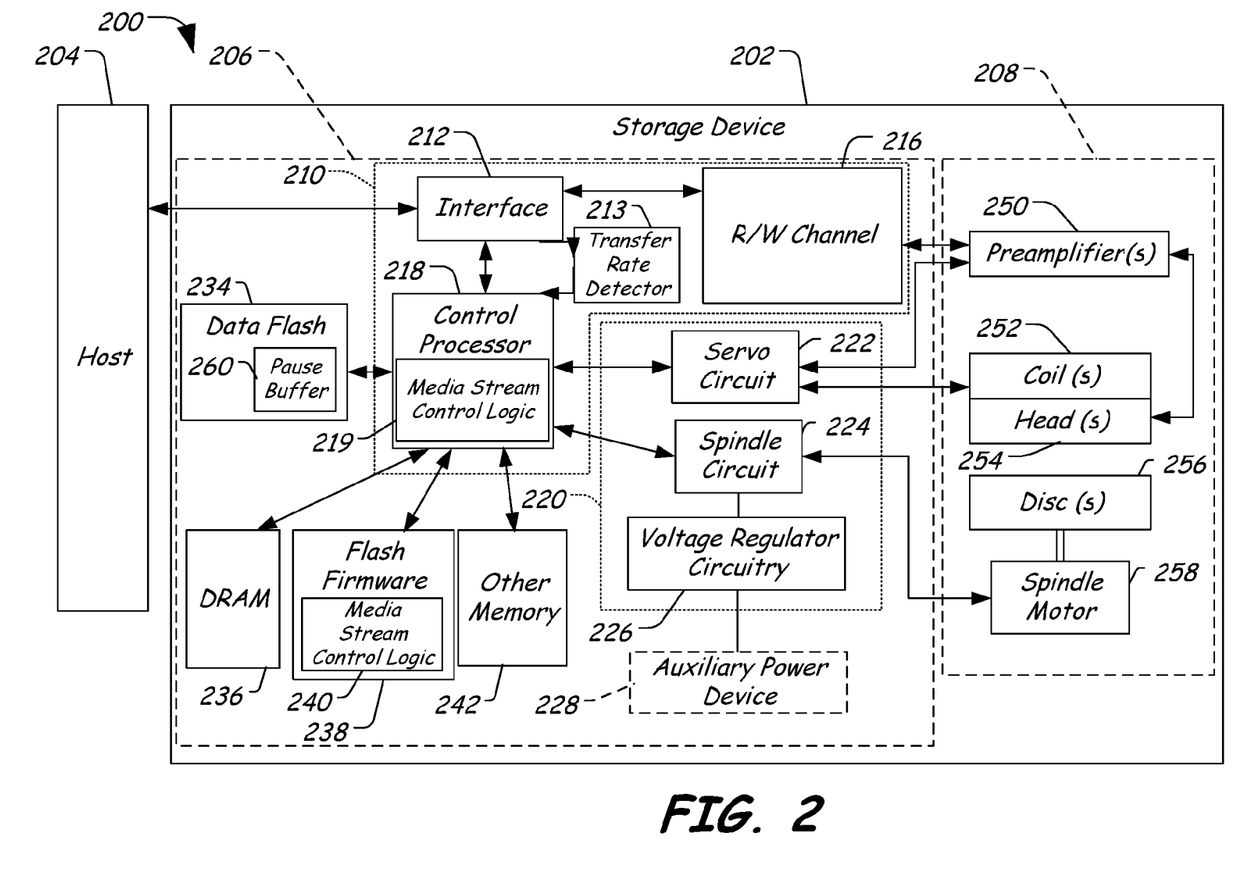
FIG. 2 is a block diagram of a second particular illustrative embodiment of a system including a hybrid storage device including a controller to store and to retrieve media data from storage media.

FIG. 2 is a block diagram of a second particular illustrative embodiment of a system 200 including a hybrid storage device 202 having a controller (i.e., a control processor 218) to store media data to and retrieve media data from at least one of a first storage media and a second storage media. In a particular embodiment, the media content can include audio data, video data, associated metadata, other information, or any combination thereof. The hybrid storage device 202 includes both disc storage media (one or more discs 256) and solid-state storage media, such as a flash memory device (data flash 234, flash firmware 238, etc.). The hybrid storage device 202 is adapted to communicate with a host system 204. In a particular embodiment, the host system 204 can be a computer, a processor, a personal digital assistant (PDA), another electronic device, or any combination thereof. In a particular example, the hybrid storage device 202 can communicate with the host system 204 via a universal serial bus (USB), another type of communication interface, or any combination thereof. In another particular example, the hybrid storage device 202 can be a stand-alone device that is adapted to communicate with the host system 204 via a network, such as via a network cable using a networking protocol.

The hybrid storage device 202 includes recording subsystem circuitry 206 and a head-disc assembly 208. The recording subsystem circuitry 206 includes storage device read/write control circuitry 210 and disc-head assembly control circuitry 220. The recording subsystem circuitry 206 further includes an interface circuit 212, which includes a data buffer for temporarily buffering data received via the interface circuit 212 and which includes a sequencer for directing the operation of the read/write channel 216 and the preamplifier 250 during data transfer operations. The interface circuit 212 is coupled to the host system 204 and to a control processor 218, which is adapted to control operation of the hybrid storage device 202. In a particular embodiment, the control processor 218 includes media stream control logic 219 that is adapted to determine a data transfer rate across the interface circuit 212 based on measurement data received from a transfer rate detector 213 and to selectively store received data at a pause buffer 260 of a first memory, such as a data flash 234, at one or more discs 256, or any combination thereof. In a particular embodiment, the one or more discs 256 represent rotatable, non-volatile storage media adapted to store media data, applications, metadata, or any combination thereof.

The control processor 218 is coupled to a servo circuit 222 that is adapted to control the position of one or more read/write heads 254 relative to the one or more discs 256 as part of a servo loop established by the one or more read/write heads 254. The one or more read/write heads 254 can be mounted to a rotary actuator assembly to which a coil 252 of a voice coil motor (VCM) is attached. The VCM includes a pair of magnetic flux paths between which the coil 252 is disposed so that the passage of current through the coil 252 causes magnetic interaction between the coil 252 and the magnetic flux paths, resulting in the controlled rotation of the actuator assembly and the movement of the one or more heads 254 relative to the surfaces of the one or more discs 256. The servo circuit 222 is used to control the application of current to the coil 252, and hence the position of the heads 254 with respect to the tracks of the one or more discs 256.

The disc-head assembly control circuitry 220 includes the servo circuit 222 and includes a spindle circuit 224 that is coupled to a spindle motor 258 to control the rotation of the one or more discs 256. The hybrid storage device 202 also includes an auxiliary power device 228 that is coupled to voltage regulator circuitry 226 of the disc-head assembly control circuitry 220 and that is adapted to operate as a power source when power to the hybrid storage device 202 is lost. In a particular embodiment, the auxiliary power device 228 can be a capacitor or a battery that is adapted to supply power to the hybrid storage device 202 under certain operating conditions. In a particular example, the auxiliary power device 228 can provide a power supply to the recording subsystem assembly 206 and to the disc-head assembly 208 to record data to the one or more discs 256 when power is turned off. Further, the auxiliary power device 228 may supply power to the recording subsystem assembly 206 to record data to the data flash 234 when power is turned off.

Additionally, the hybrid storage device 202 includes the data flash memory 234, a dynamic random access memory (DRAM) 236, firmware 238 (such as a flash memory), other memory 242, or any combination thereof. In a particular embodiment, the firmware 238 is accessible to the control processor 218 and is adapted to store the media stream control logic instructions 240. In a particular embodiment, the data flash 234 may be used to record the pause buffer 260 and associated metadata.

In a particular embodiment, the control processor 218 is adapted to receive media content from the host system 204 via the interface circuit 212. The media content can include video data, audio data, text data, associated metadata, other data, or any combination thereof. The transfer rate detector 213 is coupled to the interface circuit 212 to determine a rate of data transfer across the interface circuit 212. In response to determining a first data rate, the media stream control logic 219 executed by the control processor 218 is adapted to record the received data at the pause buffer 260 within the data flash 234. In response to determining a second data rate, the media stream control logic 219 is adapted to record the received data at the data flash 234, at the one or more discs 256, or any combination thereof. Further, depending on a state of the host system 204 (i.e., whether the host system 204 is requesting playback of pre-recorded data), the media stream control logic 219 is adapted to differentiate the different states of the host system 204 such that the storage device 202 can determine if it only needs to record the pause buffer 260 to the flash memory 234 or if there is a need for data to be written to or read from the one or more discs 256.

In a particular example, when the only activity is the recording or playback of the pause buffer 260, the media stream control logic 219 is adapted to read from and write to the data flash 234 and the spindle circuit 224 can turn off power to the spindle motor 258. When additional recording is needed or if pre-recorded data is being retrieved and provided, then the media stream control logic 219 is adapted to control the spindle circuit 224 to turn on power to the spindle motor 258 and to record data to the one or more discs 256 and/or to retrieve the pre-recorded data from the one or more discs 256.

FIGS. 3-8 are diagrams of a particular illustrative embodiment of a digital video recorder (DVR) device, including a hybrid storage device, illustrating conditions where a flash memory, a disc media, or any combination thereof is selectively activated to store and retrieve media data.

Figure 3:
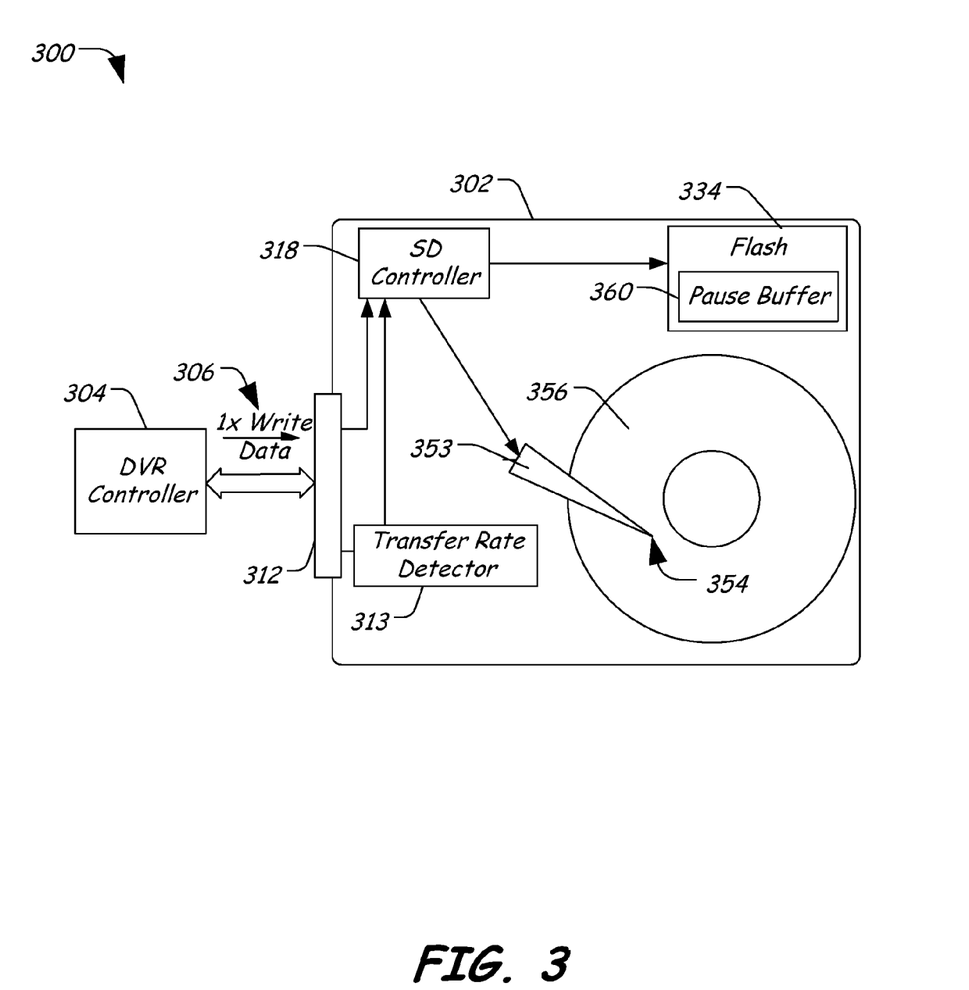
FIGS. 3-8 are diagrams of a particular illustrative embodiment of a digital video recorder (DVR) device, including a hybrid storage device, illustrating conditions where a flash memory, a disc media, or any combination thereof is selectively activated to store and retrieve media data.

FIG. 3 is a block diagram of a particular illustrative embodiment of a storage system 300 for use in a digital video recorder (DVR) system. The storage system 300 includes a storage device 302 that communicates with a DVR controller 304 via an interface 312 and an associated data bus to receive media data. The storage device 302 includes a transfer rate detector 313 coupled to the interface 312 and to a storage device controller 318. The transfer rate detector 313 is adapted to measure a data transfer rate of media data received over the interface 312 and to provide transfer rate data related to the measured data transfer rate to the storage device controller 318. The storage device controller 318 is coupled to the interface 312 to receive the media data from the DVR controller 304. The storage device controller 318 is adapted to selectively write the media data to a pause buffer 360 of flash memory 334 or to one or more discs 346 via a read/write assembly 353 including a read/write head 354.

In a particular embodiment, data is received at a rate that is acceptable to record media data from a single tuner of the DVR device. In a particular embodiment, the DVR device can include multiple tuners that are adapted to decode particular channels from a media stream. In this particular example, the transfer rate detector 313 detects a transfer rate of one times (1×) a rate needed to record data from a single tuner at the interface 312. In this example, the one or more discs 356 are not spinning, there is no playback, and the write data 306 is recorded to the pause buffer 360 of the data flash 334.

Figure 4:
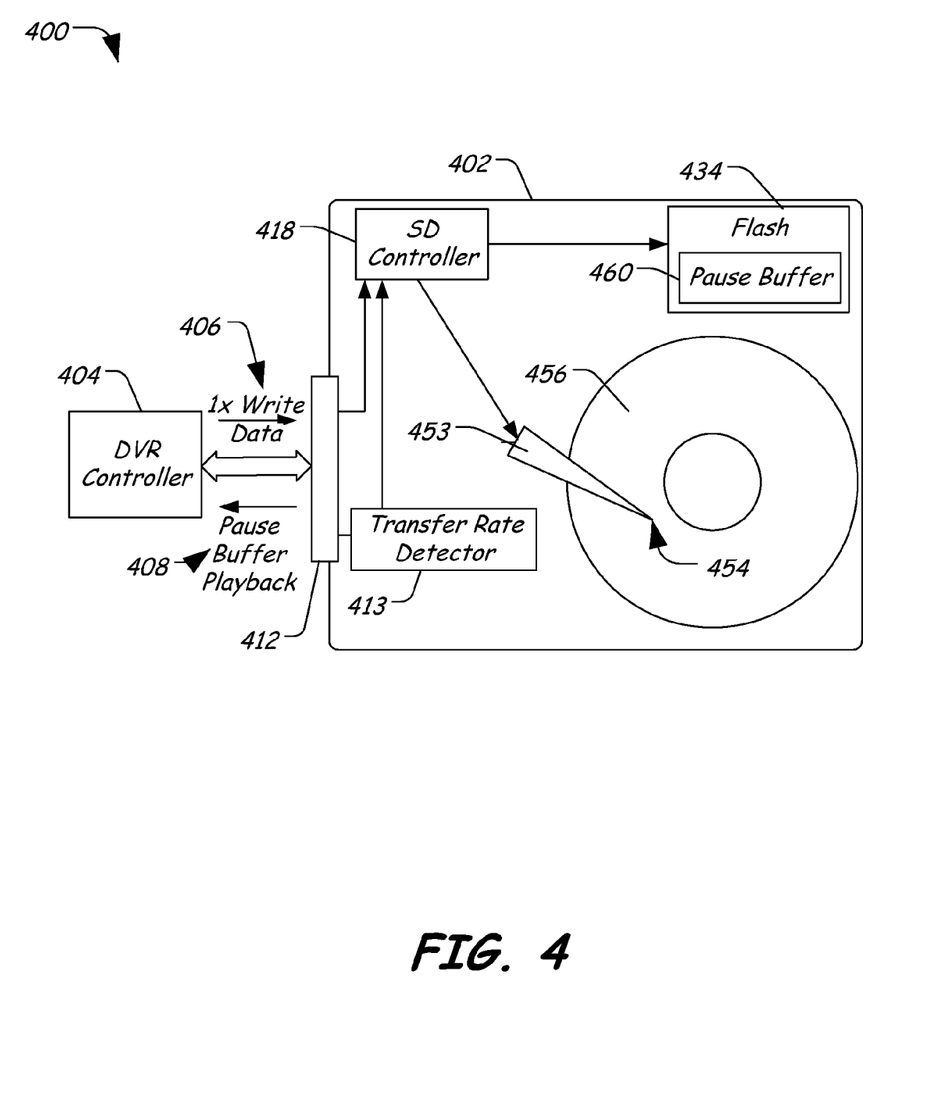

FIG. 4 is a block diagram of a particular illustrative embodiment of a storage system 400 for use in a digital video recorder (DVR) system. The storage system 400 includes a storage device 402 that communicates with a DVR controller 404 via an interface 412 and an associated data bus to receive media data. The storage device 402 includes a transfer rate detector 413 coupled to the interface 412 and to a storage device controller 418 to measure a data transfer rate related to media data received via the interface 412. The transfer rate detector 413 is adapted to to provide transfer rate data to the storage device controller 418. The storage device controller 418 is coupled to the interface 412 to receive the media data from the DVR controller 404. The storage device controller 418 is adapted to selectively write the media data to a pause buffer 460 of flash memory 434 or to one or more discs 446 via a read/write assembly 453 including a read/write head 454.

In a particular embodiment, data is received at a rate that is acceptable to record a single tuner of the DVR device and media data is played back from the pause buffer 460. In a particular embodiment, the DVR device can include multiple tuners that are adapted to decode particular channels from a media stream. In this particular example, the transfer rate detector 413 detects a transfer rate of one times (1×) a rate needed to record data from a single tuner at the interface 412. In this example, the one or more discs 456 are not spinning, the write data 406 is recorded to the pause buffer 460 of the data flash 434, and pause buffer data 460 is played back (as generally indicated at 408) from the data flash 434.

Figure 5:
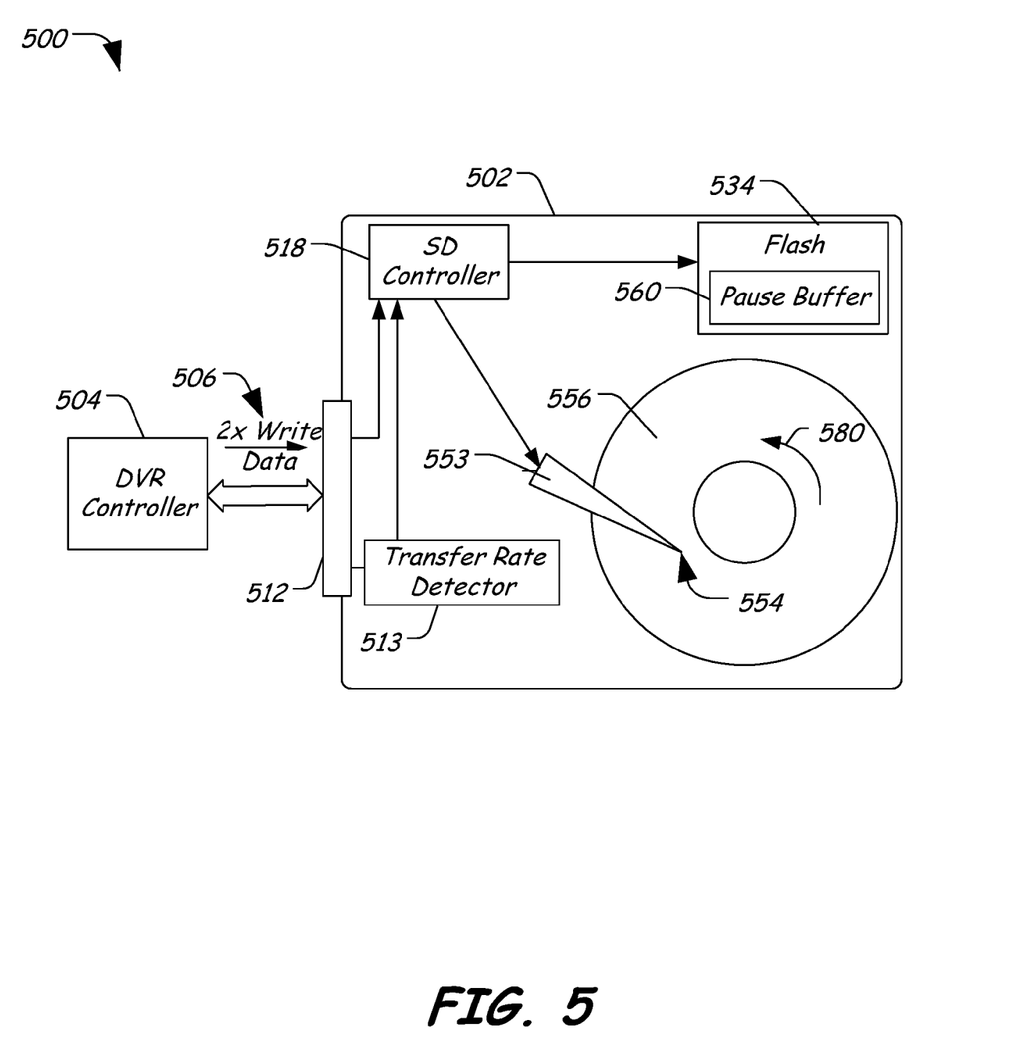

FIG. 5 is a block diagram of a particular illustrative embodiment of a storage system 500 for use in a digital video recorder (DVR) system. The storage system 500 includes a storage device 502 that communicates with a DVR controller 504 via an interface 512 and an associated data bus to receive media data. The storage device 502 includes a transfer rate detector 513 coupled to the interface 512 and to a storage device controller 518. The transfer rate detector 513 is adapted to measure a data transfer rate of the media data received over the interface 512 and to provide transfer rate data related to the measured data transfer rate to the storage device controller 518. The storage device controller 518 is coupled to the interface 512 to receive the media data from the DVR controller 504. The storage device controller 518 is adapted to selectively write the media data to a pause buffer 560 of flash memory 534 or to one or more discs 546 via a read/write assembly 553 including a read/write head 554.

In a particular embodiment, data is received at a rate that corresponds to a rate for recording two tuners of the DVR device. In this particular example, the transfer rate detector 513 detects a transfer rate of two times (2×) a rate needed to record data from a single tuner at the interface 512. In this instance, the media data received via the interface 513 relates to decoded data from two different tuners, including a first tuner to decode a first channel for display and a second tuner to decode a second channel to record a scheduled program. In this example, the write data 506 includes a live program and a second program scheduled for recording. The one or more discs 556 are spinning to record the scheduled program (as generally indicated at 580), the live program is recorded to the pause buffer 560 of the data flash 534, and there is no playback.

Figure 6:
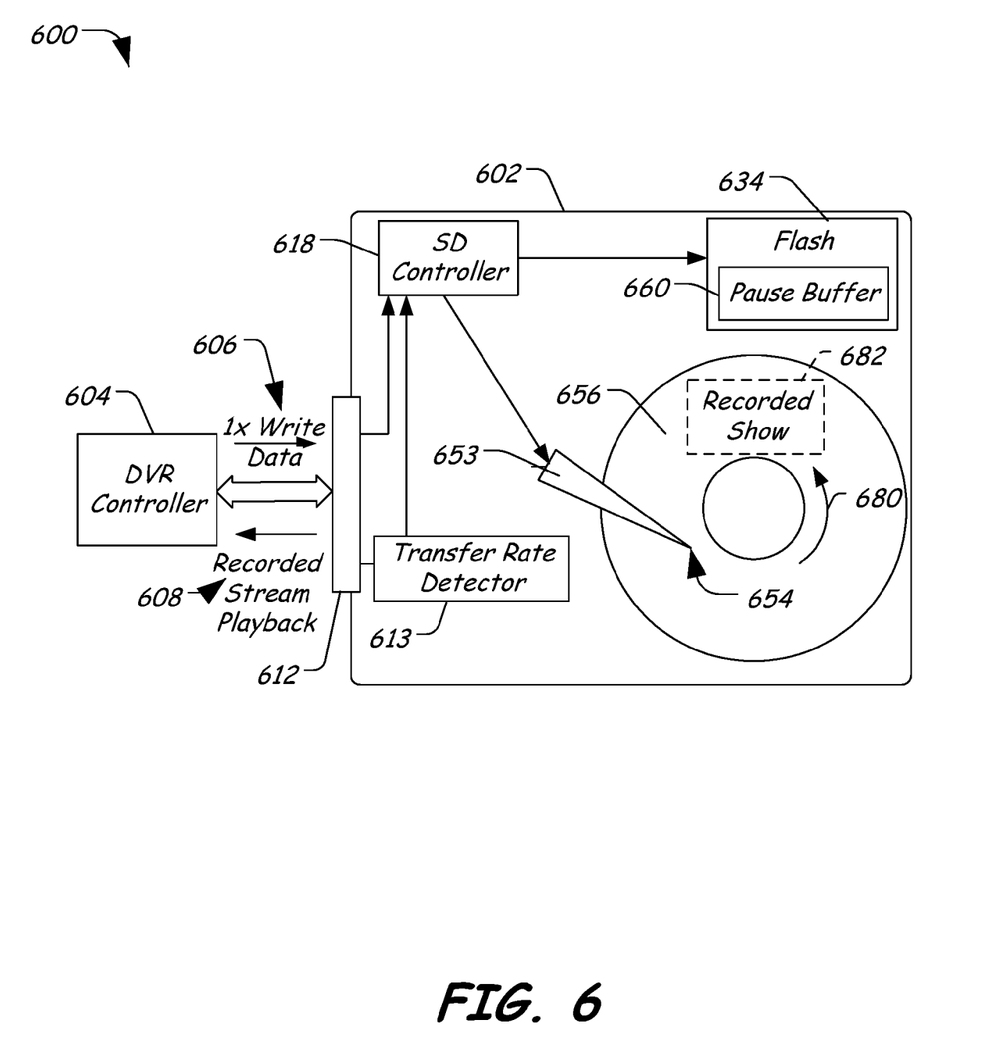

FIG. 6 is a block diagram of a particular illustrative embodiment of a storage system 600 for use in a digital video recorder (DVR) system. The storage system 600 includes a storage device 602 that communicates with a DVR controller 604 via an interface 612 and an associated data bus to receive media data. The storage device 602 includes a transfer rate detector 613 coupled to the interface 612 and to a storage device controller 618. The transfer rate detector 613 is adapted to measure a data transfer rate of media data received over the interface 612 and to provide transfer rate data related to the measured data transfer rate to the storage device controller 618. The storage device controller 618 is coupled to the interface 612 to receive the media data from the DVR controller 604. The storage device controller 618 is adapted to selectively write the media data to a pause buffer 660 of flash memory 634 or to one or more discs 646 via a read/write assembly 653 including a read/write head 654.

In a particular embodiment, media data is received at a rate that corresponds to a rate for recording a single tuner of the DVR device. In this particular example, the transfer rate detector 613 detects a transfer rate of one times (1×) a rate needed to record data from a single tuner. Further, in this instance, the data 606 received via the interface 613 relates to decoded data from the tuner and is recorded to the pause buffer 660 of the data flash 634. The one or more discs 656 are spinning (as generally indicated at 680) to playback pre-recorded media content 682, which playback is as generally indicated at 608. In this particular example, the pre-recorded media content 682 can correspond to a previously scheduled recording of media content.

Figure 7:
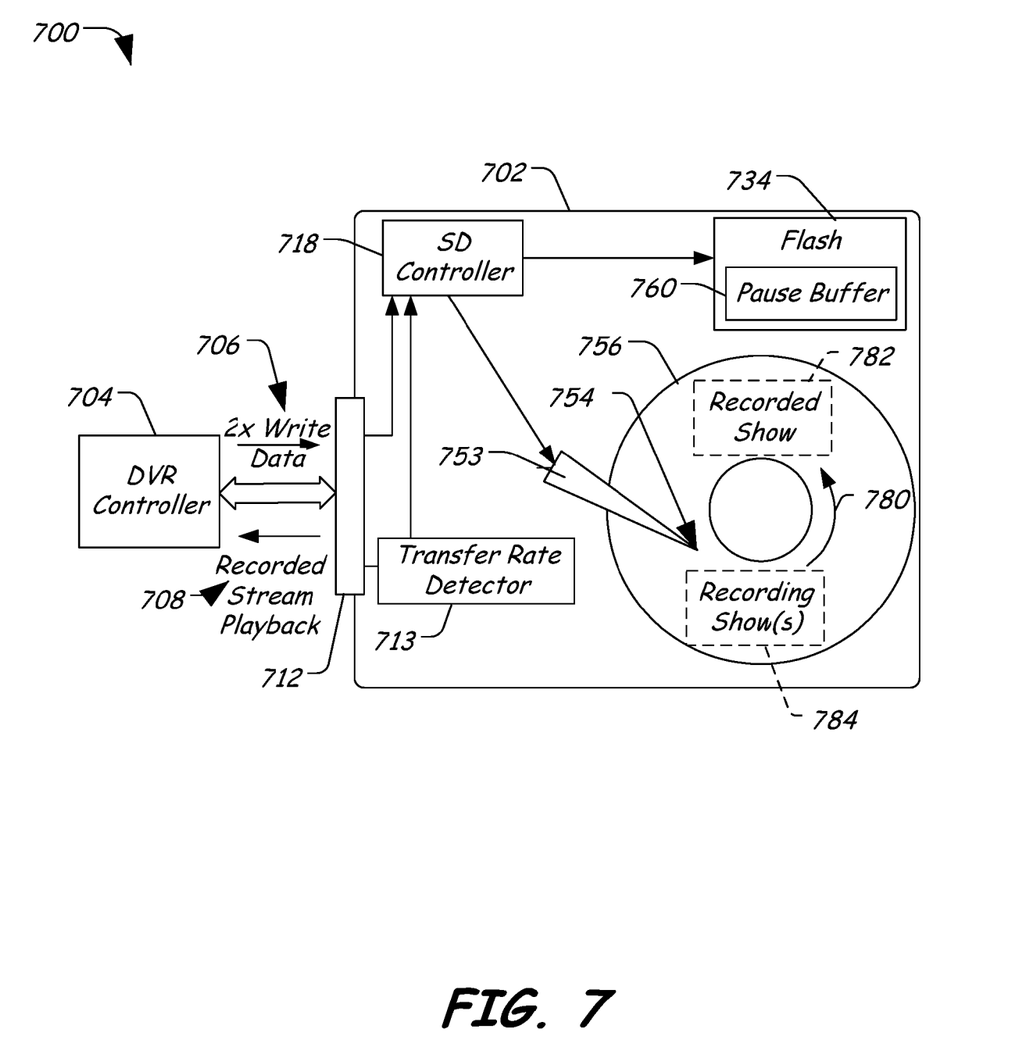

FIG. 7 is a block diagram of a particular illustrative embodiment of a storage system 700 for use in a digital video recorder (DVR) system. The storage system 700 includes a storage device 702 that communicates with a DVR controller 704 via an interface 712 and an associated data bus to receive media data. The storage device 702 includes a transfer rate detector 713 coupled to the interface 712 and to a storage device controller 718. The transfer rate detector 713 is adapted to measure a data transfer rate of the media data received over the interface 712 and to provide transfer rate data related to the measured data transfer rate to the storage device controller 718. The storage device controller 718 is coupled to the interface 712 to receive the media data from the DVR controller 704. The storage device controller 718 is adapted to selectively write the media data to a pause buffer 760 of flash memory 734 or to one or more discs 746 via a read/write assembly 753 including a read/write head 754.

In a particular embodiment, the media data is received at a data rate that corresponds to a rate for recording two tuners of the DVR device. In this particular example, the transfer rate detector 713 detects a transfer rate of two times (2×) a rate needed to record the media data from a single tuner. In this instance, the media data 706 received via the interface 713 relates to decoded data from the tuners and is recorded to the pause buffer 760 of the data flash 734 and to the one or more discs 756, which are spinning. The one or more discs 756 are spinning (as generally indicated at 780) to record media content (recording shows 784) and to retrieve media content (pre-recorded media content 782) from the one or more discs 756. The retrieved pre-recorded media content 782 is provided to the DVR controller 704 via the interface 712 as generally indicated at 708.

Figure 8:
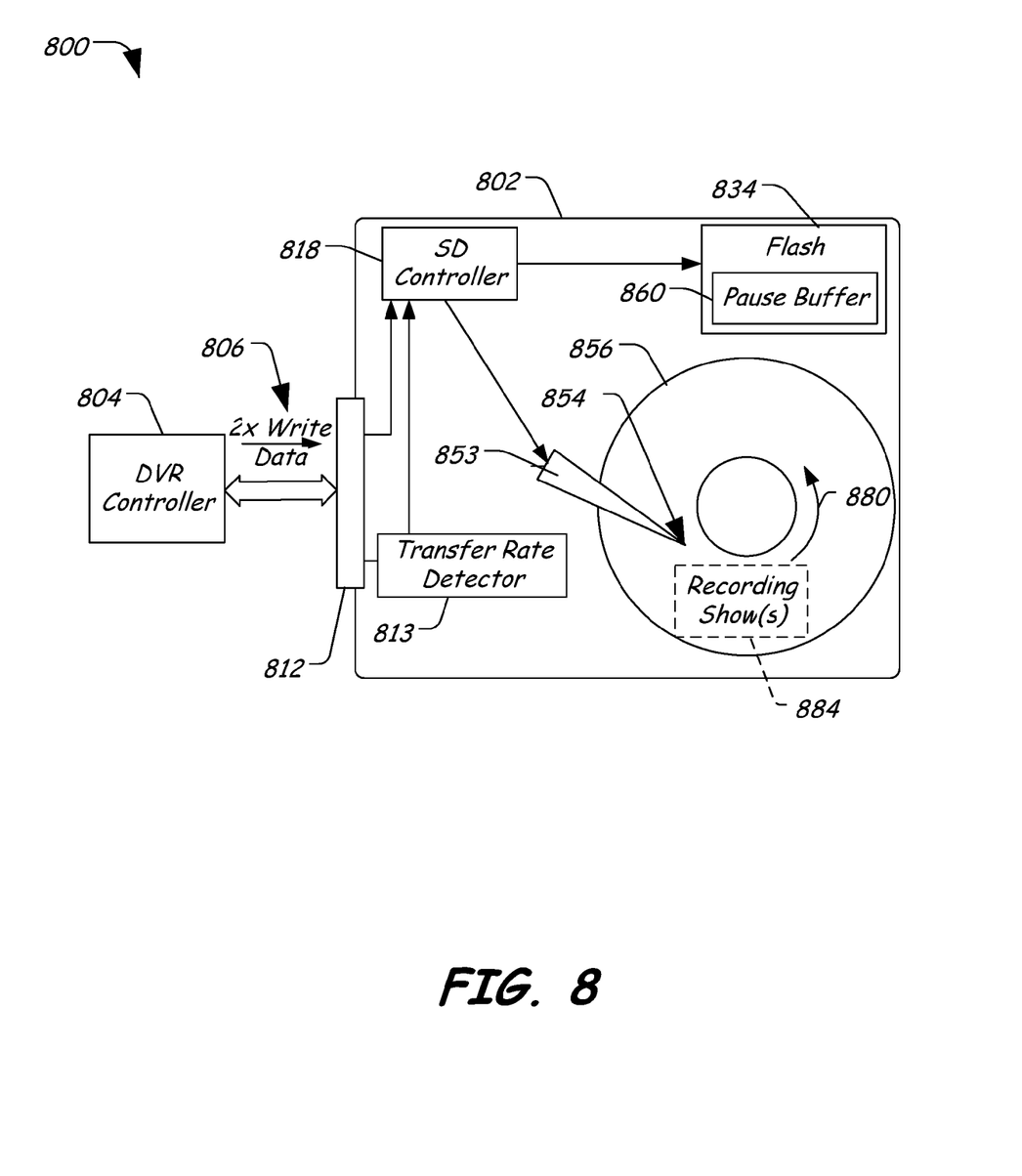

FIG. 8 is a block diagram of a particular illustrative embodiment of a storage system 800 for use in a digital video recorder (DVR) system. The storage system 800 includes a storage device 802 that communicates with a DVR controller 804 via an interface 812 and an associated data bus to receive media data. The storage device 802 includes a transfer rate detector 813 coupled to the interface 812 and to a storage device controller 818. The transfer rate detector 813 is adapted to measure a data transfer rate of the media data received over the interface 812 and to provide transfer rate data related to the measured data transfer rate to the storage device controller 818. The storage device controller 818 is coupled to the interface 812 to receive the media data from the DVR controller 804. The storage device controller 818 is adapted to selectively write the media data to a pause buffer 860 of flash memory 834 or to one or more discs 846 via a read/write assembly 853 including a read/write head 854.

In a particular embodiment, the media data is received at a rate corresponding to a rate for recording media content from two tuners of the DVR device. In this particular example, the transfer rate detector 813 detects a transfer rate of two times (2×) a rate needed to record the media data from a single tuner. In this instance, the media data 806 received via the interface 813 relates to decoded media data from the tuners, and the media data 806 is recorded the one or more discs 856, which are spinning (as generally indicated at 880) to record media content (recording shows 884). In this instance, the received data relates to pre-scheduled shows. In this instance, there is no playback of recorded media.

From the examples provided in FIGS. 3-8, the disc need only be spinning for writing media data when there are two data streams being recorded or when a pre-recorded show is being played back. The storage device controllers 118, 218, 318, 418, 518, 618, 718, and 818, illustrated in FIGS. 1-8 respectively, are adapted to make decisions on whether to spin the one or more discs based on the received media data transfer rate.

In a particular embodiment, data transfer rate for media data at a particular DVR system are deterministic, so the controller can use data derived from a measured data transfer rate to make decisions about where to write the received data. If there is write activity, the controller uses the measured data transfer rate of the data write operation. If the measured data transfer rate is one times the rate needed to record one tuner, then the data can be written to the flash memory and logical block addresses can be listed as residing in the flash memory. If the data transfer rate is two times the rate needed to record one tuner, then the controller can activate the one or more discs (i.e., the discs can be spun up) to write the media data associated with at least one data stream to the one or more discs, and the logical block addresses can be written to the disc and listed as residing on the disc. In response to a read data request, the controller can examine a logical block address table to determine if the logical block address resides in flash or on the one or more discs, and the controller can retrieve and transfer the data from the appropriate storage medium.

In a particular embodiment, the controller can encounter a situation where data is simultaneously being recorded to the pause buffer and for a scheduled recording. In this instance, a subsequent playback from the pause buffer can be read from the one or more discs instead of from the pause buffer. However, this case will be rare.

By utilizing the controller to make determinations about where to store the media data based on the data transfer rate, the disc media can be powered down except in situations where the disc media is needed for recording or playback. Such selective activation of the disc media provides a number of benefits, including reduced disc media usage, reduced wear on the disc media, reduced acoustic noise due to spinning of the disc media, and enhanced playback of the media content. In a particular example, the longevity of the disc media may be enhanced.

Figure 9:
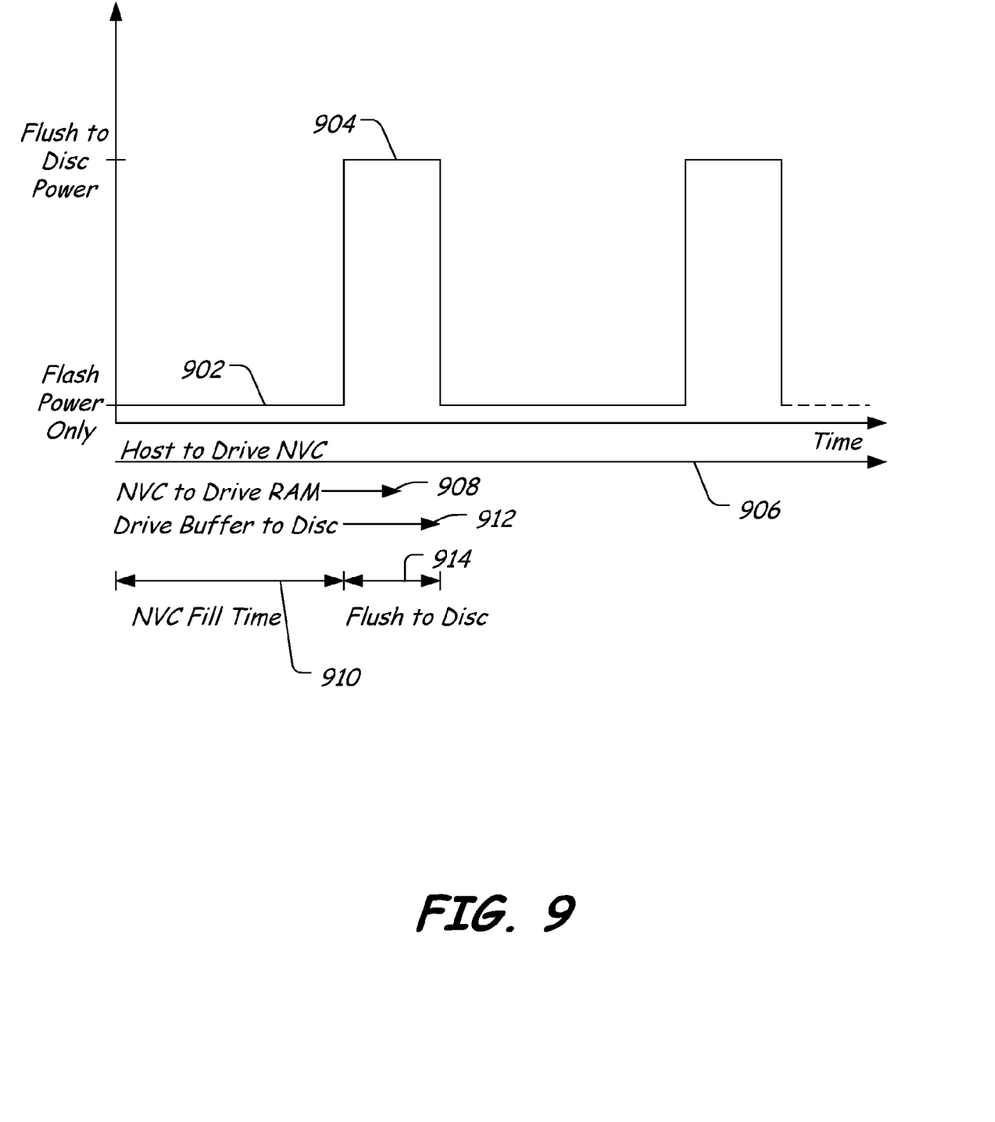
FIG. 9 is graph of a particular illustrative embodiment of a storage device power versus workload for the storage device for recording a pause buffer data stream.

FIG. 9 is graph 900 of a particular illustrative embodiment of a storage device power versus time for a particular representative embodiment of a storage device including a first storage media to store a pause buffer and including a second storage media. As illustrated by the graph 900, power consumption varies between a flash memory only power level (at 902) and a disc media power level (at 904) during a time period where data is being written from the host system to the storage device, as generally indicated at 906. As the non-volatile cache fills, power is supplied only to the flash memory (i.e., the non-volatile cache) at 910. The data is then provided to drive random access memory (RAM) at 908 and written from the RAM buffer to the second non-volatile memory, such as a disc media (as indicated at 912). While data is written to RAM and then to the disc media, power consumption increases to the disc media power level 904 to power the second non-volatile storage media (i.e., the disc media) at 914.

In a particular example, the data stream can be recorded to the non-volatile cache instead of recording the data stream to the disc media. Once the non-volatile cache is full, the disc media is enabled over the time period indicated at 910, and the non-volatile cache is flushed to the disc media at a high data rate, which can be much faster than the data transfer rate across the interface. Once the non-volatile cache is flushed and the data is recorded to the disc media, power to the disc media can be disabled until the non-volatile cache becomes full again. In a particular example, if the non-volatile cache is large (i.e., 2 to 8 Gigabytes or larger), the entire pause buffer can be maintained in the non-volatile cache, resulting in no disc spin time when there is no user interactions (i.e., when no scheduled recording or playback is in progress). When a user interaction is initiated, such as live program pause and/or rewind, the media stream can continue to be recorded to the flash memory as the recorded portion is retrieved for playback from the flash media. Alternatively, the recording of the media data can be moved to the disc media, and the user initiated read stream can be served from the non-volatile cache.

Figure 10:
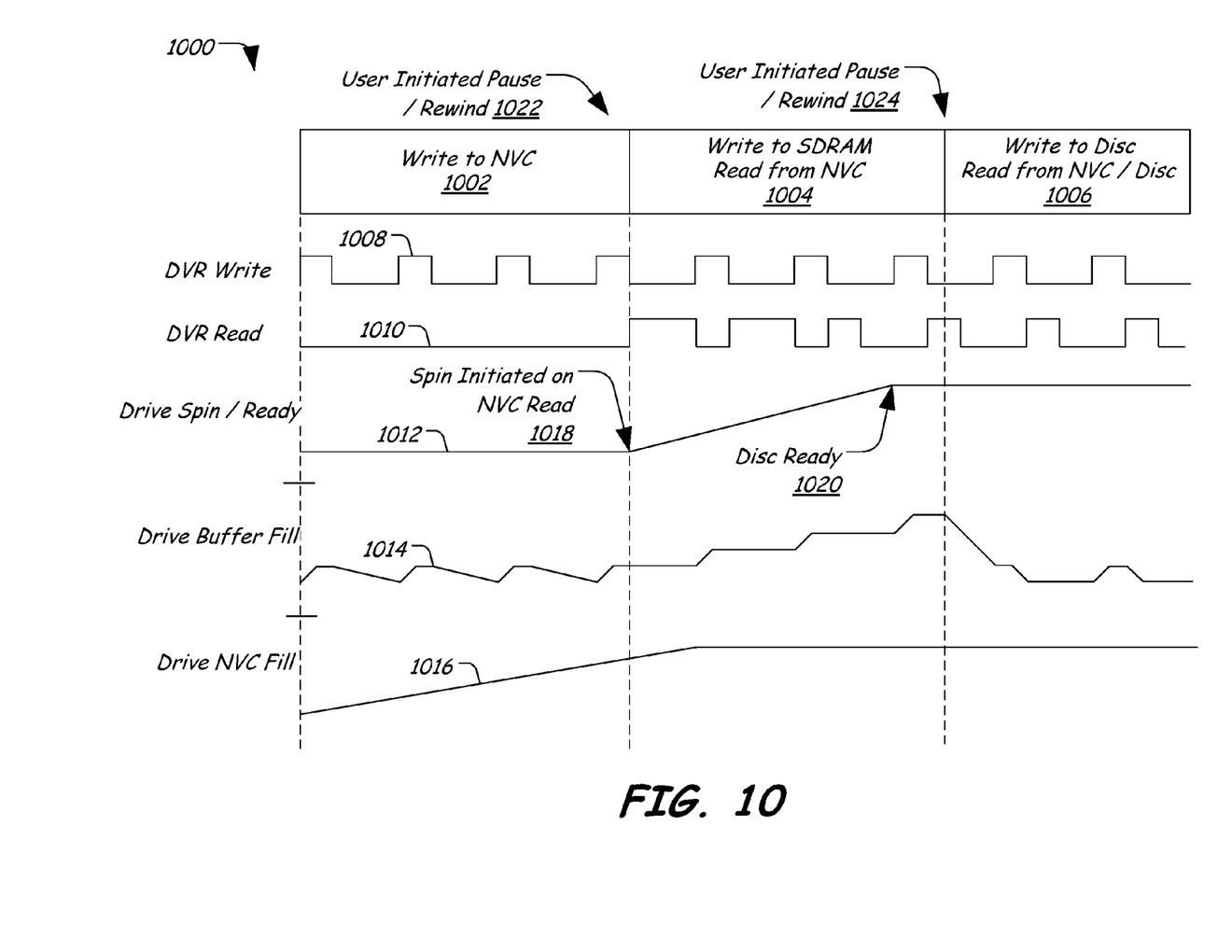
FIG. 10 is a graph of a particular illustrative embodiment of power consumption versus time for a hybrid storage device during a live media stream in response to a pause/rewind operation.

FIG. 10 is a graph 1000 of a particular illustrative embodiment of power consumption versus time for a hybrid storage device during a live media stream in response to a pause/rewind operation. The graph 1000 includes a write to non-volatile cache portion 1002, a write to a synchronous dynamic random access memory (SDRAM) and read from the non-volatile cache portion 1004, and a write to disc and read from the non-volatile cache/disc portion 1006. The DVR write signal 1008 is represented by a sequence of pulses. The DVR read signal 1010 is low until the user initiated pause/rewind selection 1022, at which point the DVR read signal increases. The drive spin/ready signal 1012 increases from a point where the spin is initiated on a non-volatile cache read 1018, which read may be triggered by the user initiated pause/rewind operation 1022 during live streaming. The drive spin/ready signal 1012 increases to a disc ready level at 1020, just before the write to disc and read from NVC/disc portion 1006. At 1024, the user initiate pause/rewind operation begins playback, so data is recorded to the disc media and the SDRAM buffer can be flushed to the disc media, allowing the NVC drive fill signal 1016 to plateau. The drive buffer fill signal 1014 varies in connection with the DVR write signal 1008, increasing during pulses of the DVR write signal 1008 and decreasing between pulses of the DVR write signal 1008.

In the particular example of FIG. 10, assuming a data transfer rate of 2.25 MB/s and a pause buffer of approximately 8.1 GB, the pause buffer can store approximately 1 hour of media content from a single tuner before the non-volatile cache flushes the pause buffer to the disc media. Given a five second standby to read data from the storage media or the non-volatile cache, the read buffer requires approximately 11.25 MB of SDRAM space. This particular configuration can achieve a non-volatile memory write throughput of approximately 2.46 MB/s.

Figure 11:
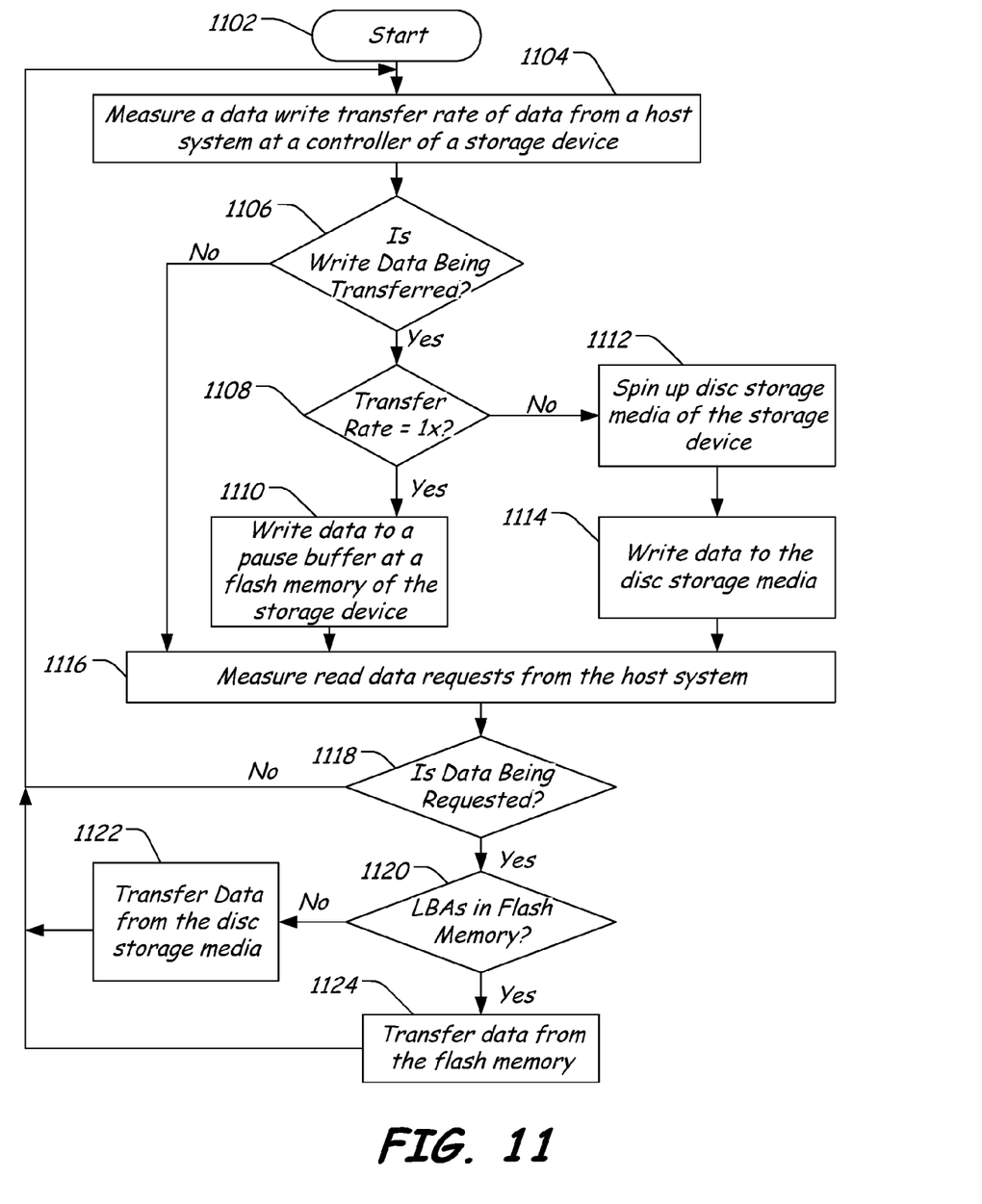
FIG. 11 is a flow diagram of a particular embodiment of a method of storing and retrieving media data.

FIG. 11 is a flow diagram of a particular embodiment of a method of storing and retrieving media data. In this example, the method starts at 1102. Advancing to 1104, a data write transfer rate from the host system is measured at the controller of the storage device. In a particular example, the write data transfer rate can be measured by a data transfer rate detector, by the interface itself, by the controller itself, or any combination thereof. Continuing to 1106, the controller determines if data is being transferred. If yes, the method advances to 1108 and the controller determines if the transfer rate is one times a rate to record a single tuner. If yes, the method proceeds to 1110 and data is written to a pause buffer at a flash memory of the storage device. Moving to 116, read data requests from the host system are measured.

Returning to 1106, if write data is not being transferred, the method advances to 1116 and read data requests from the host system are measured. Otherwise, returning to 1108, if the transfer rate is not one times a rate associated with a single tuner, the method continues to 1112, and the disc storage media of the storage device is spun up. Proceeding to 1114, data is written to the disc storage media. Advancing to 1116, read data requests from the host system are measured.

Moving to 1118, if data is not being requested (i.e., if there are no read requests), the method returns to 1104 and a data write transfer rate from the host system is measured at the controller of the storage device. Otherwise, if data is being requested at 1118, the method advances to 1120 and the controller determines whether logical block addresses associated with the requested data related to the flash memory. If so, the method advances to 1124 and data is transferred from the flash memory. Otherwise, the method advances to 1122 and data is transferred from the storage media. The method then returns to 1104 and a data write transfer rate from the host system is measured at the controller of the storage device.

Figure 12:
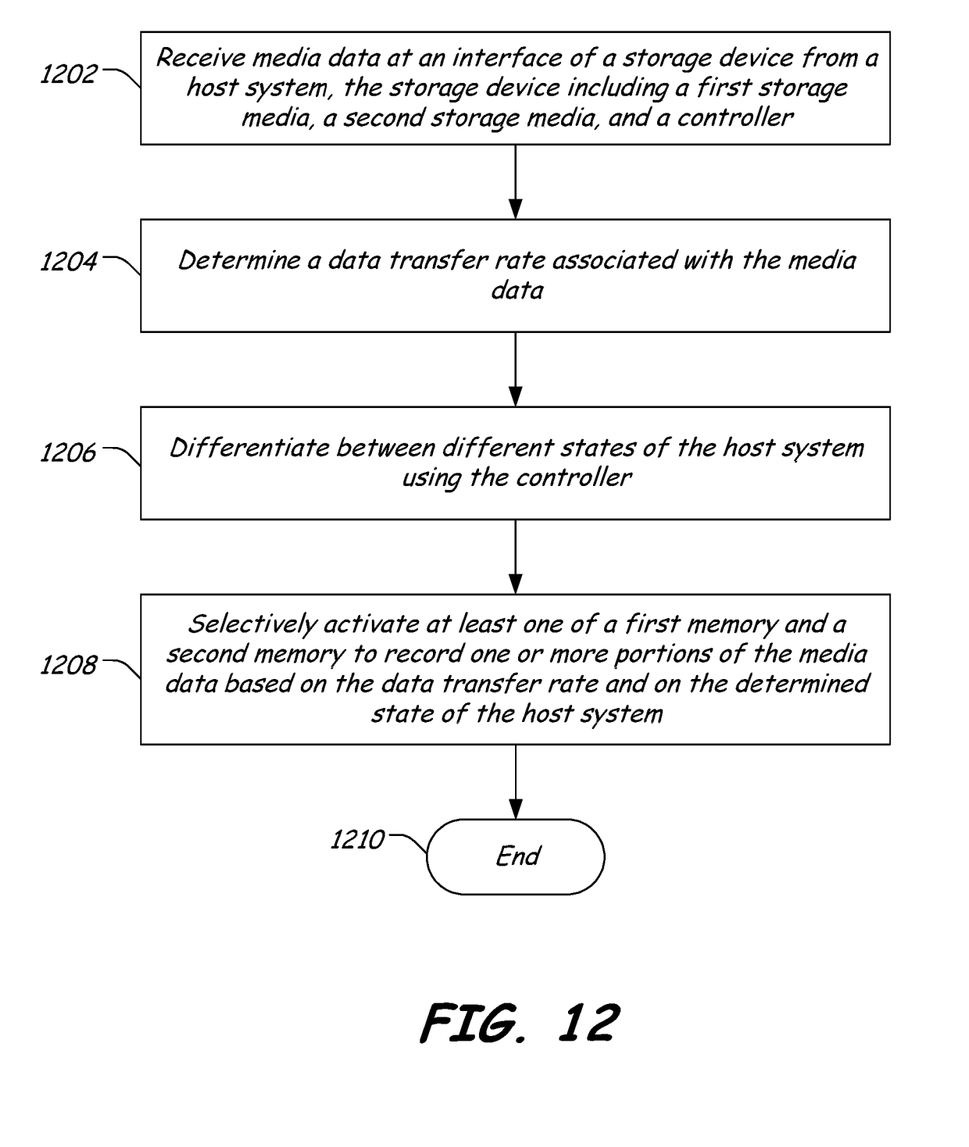
FIG. 12 is a flow diagram of a second particular embodiment of a method of storing and retrieving media data.

FIG. 12 is a flow diagram of a second particular illustrative embodiment of a method of selectively activating at least one of a first storage media and a second storage media to record media data. At 1202, media data is received at an interface of a storage device from a host system, where the storage device includes a first storage media, a second storage media, and a controller. In a particular embodiment, the media data includes video data, audio data, text data, metadata, or any combination thereof.

Proceeding to 1204, a data transfer rate associated with the media data is determined. In a particular example, the data transfer rate can be one or more times a rate to record a single tuner. Advancing to 1206, the controller differentiates between different states of the host system. In a particular example, the controller is adapted to determine whether the host system is receiving media data related to a pre-scheduled recording, whether the host system is displaying a live program, whether the host system is recording multiple pre-scheduled programs, whether the host system is playing back media data either from a pause buffer or from a recording media, or any combination thereof.

Continuing to 1208, the controller selectively activates at least one of a first memory and a second memory to record one or more portions of the media data based on the data transfer rate and on the determined state of the host system. In a particular example, the first memory can be a solid-state storage media (such as a flash memory) and the second memory can be a disc storage media. In another particular example, the first memory and the second memory can be solid-state storage media. In a particular embodiment, the one or more portions of the media data can include particular decoded media data streams decoded from encoded media data by one or more tuner circuits. In a particular example, a first media stream can be recorded at a pause buffer of the first memory and a second media stream can be recorded at the second memory. In a particular example, media data can also be retrieved for playback from the first memory, the second memory, or any combination thereof. The method terminates at 1210.

In conjunction with the storage device, storage device controllers, and methods disclosed above, a storage device is disclosed that can be used in connection with a computing device, a digital video recording (DVR) device, another electronic device, or any combination thereof. In a particular example, the storage device is adapted to record and retrieve media data, such as streaming multi-media data (video, audio, text, or any combination thereof), at one of a first storage media, a second storage media, or any combination thereof, based on a data transfer rate at the interface of the storage device. In a particular example, the controller is adapted to determine the data transfer rate and the state of the host system (such as the whether the host system is playing back a pre-recorded program) and to selectively activate a disc data storage media, a flash data storage media, another data storage media, or any combination thereof to record and/or retrieve media data. By selectively activating a disc data storage media as needed, overall power consumption is reduced. Further, disc media acoustic noise and disc media wear are reduced, which can improve device performance and extend its usable lifetime.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the data storage system while maintaining substantially the same functionality without departing from the scope and spirit of the present invention. In addition, although the preferred embodiment described herein is directed to a hybrid data storage system including a flash data storage media and a disc data storage media for storing media content (such as television programs and associated metadata), it will be appreciated by those skilled in the art that the teachings of the present invention can be applied to other data transfer applications where data is received across an interface from one or more host systems, without departing from the scope and spirit of the present invention.

What is claimed is:

1. A system comprising:
   a network interface responsive to a network to receive media data;
   a first tuner coupled to the network interface to decode a first media stream from the received media data;
   at least one second tuner coupled to the network interface to optionally decode at least one second media stream; and
   a data storage system including:
      an interface coupled to the first and second tuners;
      a first storage medium configured to store the first media stream at a pause buffer;
      a second storage medium configured to record one or more media streams;
      a data transfer rate detector configured to determine a data transfer rate of received media data at the interface;
      a controller adapted to:
      selectively activate at least one of the first storage medium and the second storage medium based on the determined data transfer rate; and
      selectively reduce power to the second storage medium and store the first media stream to the first storage medium when the determined data transfer rate is a rate acceptable to record the first media stream from the first tuner to the first data storage medium and when the storage system is not transferring a recorded media stream via the interface.

2. The system of claim 1, wherein the received media data is associated with a television broadcast, and wherein the second storage medium is adapted to record media data associated with a scheduled program.

3. The system of claim 1, wherein, in response to receiving a pause/rewind request from a host system, the controller is adapted to retrieve at least a portion of the first media stream from the first storage medium and to provide the at least a portion to the host system for playback.

4. The system of claim 1, wherein the controller is adapted to record a first media stream to the first storage medium and to record a second media stream to the second storage medium concurrently.

5. The system of claim 1, wherein the controller is adapted to retrieve at least a portion of the recorded first media stream or a recorded second media stream from one of the first storage medium or the second storage medium in response to a read request from a host system and to provide the at least a portion to the host system while the first media stream and the second media stream are being recorded.

6. The system of claim 1, wherein the first storage medium comprises a portion of the second storage media allocated to store a pause buffer and associated metadata.

7. The system of claim 1, wherein the first storage medium includes a flash memory and the second storage medium includes a disc storage media.

8. The system of claim 1, wherein the first tuner is active and the first media stream is stored at the first storage medium, and wherein the at least one second tuner is inactive and the second storage medium is in a reduced power state.

9. A system comprising:
   a first tuner configured to decode a first media stream from the received media data;
   at least one second tuner configured to optionally decode at least one second media stream; and
   a data storage system coupled to the first tuner and the second tuner, the data storage system including:
      a first storage medium configured to store the first media stream at a buffer;
      a second storage medium configured to record one or more media streams;

a data transfer rate detector configured to determine a data transfer rate of media data received via the first tuner and the second tuner;
a controller adapted to:
selectively activate at least one of the first storage medium and the second storage medium based on the determined data transfer rate; and
selectively activate the first storage medium to store the first media stream and the second storage medium to retrieve a recorded media stream when the determined data transfer rate is acceptable to store the first media stream from the first tuner to the first storage medium and when the storage device is transferring a recorded media stream via the storage device interface.

10. The system of claim 9, wherein the received media data is associated with a television broadcast, and wherein the second storage medium is adapted to record media data associated with a scheduled program.

11. The system of claim 9, wherein, in response to receiving a pause/rewind request from a host system, the controller is adapted to retrieve at least a portion of the first media stream from the first storage medium and to provide the at least a portion to the host system for playback.

12. The system of claim 9, wherein the controller is adapted to record a first media stream to the first storage medium and to record a second media stream to the second storage medium concurrently.

13. The system of claim 9, wherein the controller is adapted to retrieve at least a portion of the recorded first media stream or a recorded second media stream from one of the first storage medium or the second storage medium in response to a read request from a host system and to provide the at least a portion to the host system while the first media stream and the second media stream are being recorded.

14. The system of claim 9, wherein the first storage medium comprises a portion of the second storage media allocated to store a pause buffer and associated metadata.

15. The system of claim 9, wherein the first storage medium includes a flash memory and the second storage medium includes a disc storage media.

16. A system comprising:
a first tuner configured to decode a first media stream from the received media data;
at least one second tuner configured to optionally decode at least one second media stream; and
a data storage system coupled to the first tuner and the second tuner, the data storage system including:
a first storage medium configured to store the first media stream at a buffer;
a second storage medium configured to record one or more media streams;
a data transfer rate detector configured to determine a data transfer rate of media data received via the first tuner and the second tuner;
a controller adapted to:
selectively activate at least one of the first storage medium and the second storage medium based on the determined data transfer rate; and
store the first media stream to the first storage medium and store one or more additional media streams to the second storage medium, concurrently, when the determined data transfer rate is two times a rate to store the first media stream from the first tuner.

17. The system of claim 16, wherein the first tuner is active and the first media stream is stored at the first storage medium, and wherein the at least one second tuner is inactive and the second storage medium is in a reduced power state.

18. The system of claim 16, wherein the received media data is associated with a television broadcast, and wherein the second storage medium is adapted to record media data associated with a scheduled program.

19. The system of claim 16, wherein, in response to receiving a pause/rewind request from a host system, the controller is adapted to retrieve at least a portion of the first media stream from the first storage medium and to provide the at least a portion to the host system for playback.

20. The system of claim 16, wherein the controller is adapted to record a first media stream to the first storage medium and to record a second media stream to the second storage medium concurrently.

21. The system of claim 16, wherein the controller is adapted to retrieve at least a portion of the recorded first media stream or a recorded second media stream from one of the first storage medium or the second storage medium in response to a read request from a host system and to provide the at least a portion to the host system while the first media stream and the second media stream are being recorded.

22. The system of claim 16, wherein the first storage medium comprises a portion of the second storage media allocated to store a pause buffer and associated metadata.

23. The system of claim 16, wherein the first storage medium includes a flash memory and the second storage medium includes a disc storage media.

* * * * *